United States Patent
Liu et al.

(10) Patent No.: US 10,884,795 B2
(45) Date of Patent: Jan. 5, 2021

(54) DYNAMIC ACCELERATOR SCHEDULING AND GROUPING FOR DEEP LEARNING JOBS IN A COMPUTING CLUSTER

(71) Applicant: INTERNATIONAL BUSINESS MACHINES CORPORATION, Armonk, NY (US)

(72) Inventors: Junfeng Liu, Markham (CA); Kuan Feng, Thornhill (CA); Qing Xu, Beijing (CN); Zhichao Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 15/963,331

(22) Filed: Apr. 26, 2018

(65) Prior Publication Data
US 2019/0332422 A1    Oct. 31, 2019

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/5038* (2013.01); *G06F 9/5083* (2013.01);
(Continued)

(58) Field of Classification Search
None
See application file for complete search history.

(56) References Cited

U.S. PATENT DOCUMENTS 9,424,079 B2    8/2016    Rossbach et al.
2013/0219401 A1*    8/2013    Bartfai-Walcott .... G06F 9/4881
718/103
(Continued)

FOREIGN PATENT DOCUMENTS

CN    105227669 A    1/2016
CN    106980898 A    7/2017
(Continued)

OTHER PUBLICATIONS

Chen et al., "Eyeriss: An Energy-Efficient Reconfigurable Accelerator for Deep Convolutional Neural Networks," IEEE Journal of Solid-State Circuits, 52(1), 2017 (44 pages).
(Continued)

*Primary Examiner* — Kenneth Tang
(74) *Attorney, Agent, or Firm* — Griffiths & Seaton PLLC (57) ABSTRACT

Embodiments for dynamic accelerator scheduling and grouping for deep learning jobs in a computing cluster. An efficiency metric of each job executing in the computing cluster is calculated to generate a prioritized job queue. Accelerator re-grouping execution plans are then generated based on the prioritized job queue, the accelerator re-grouping execution plans associated with a target cluster topology to be achieved according to the placement of selected jobs from the prioritized job queue in relation to a location of respective ones of a plurality of accelerators within the computing cluster. One of the accelerator re-grouping execution plans is executed to allocate the selected jobs to the respective ones of the plurality of accelerators to thereby shift the computing cluster to the target cluster topology.

15 Claims, 9 Drawing Sheets

(51) Int. Cl.
*G06F 9/50* (2006.01)
*H04L 29/08* (2006.01)
*G06N 20/00* (2019.01)

(52) U.S. Cl.
CPC ......... *G06N 20/00* (2019.01); *H04L 67/1044* (2013.01); *G06F 2209/5021* (2013.01)

(56) References Cited

U.S. PATENT DOCUMENTS

| | | | |
|---|---|---|---|
| 2017/0228645 | A1 | 8/2017 | Wang et al. |
| 2017/0316312 | A1 | 11/2017 | Goyal et al. |
| 2018/0300174 | A1* | 10/2018 | Karanasos ............ G06F 9/4881 |
| 2019/0312772 | A1* | 10/2019 | Zhao .................... G06F 9/5011 |

FOREIGN PATENT DOCUMENTS

| | | | |
|---|---|---|---|
| CN | 107203424 A | 9/2017 | |
| WO | WO-2018206994 A1 * | 11/2018 | ........... G06F 9/4881 |

OTHER PUBLICATIONS

Mcafee et al., "EMEURO: A Framework for Generating Multi-Purpose Accelerators via Deep Learning," Proceedings of the 13th Annual IEEE/ACM International Symposium on Code Generation and Optimization, 2015 (11 pages).

Anonymous, "Method and System for Smarter Resource Management for Distributed Deep Learning," An IP.com Prior Art Database Technical Disclosure, IP.com No. IPCOM000248258D, Nov. 11, 2016 (5 pages).

* cited by examiner

DYNAMIC ACCELERATOR SCHEDULING AND GROUPING FOR DEEP LEARNING JOBS IN A COMPUTING CLUSTER

BACKGROUND OF THE INVENTION

Field of the Invention

The present invention relates in general to computing systems, and more particularly, to various embodiments for scheduling and grouping accelerators for performing deep learning jobs in distributed computing environments.

Description of the Related Art

In today's interconnected and complex society, computers and computer-driven equipment are more commonplace. When performing compute-intensive workloads such as data analytics, an effective framework involves distributed parallel computing, which operates to disperse processing tasks across multiple processors operating on one or more computing devices such that parallel processing may be executed simultaneously. One example of parallel computing involves deep learning. Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics.

SUMMARY OF THE INVENTION

Various embodiments for dynamic accelerator scheduling and grouping for deep learning jobs in a computing cluster are provided. An efficiency metric of each job executing in the computing cluster is calculated to generate a prioritized job queue. Accelerator re-grouping execution plans are then generated based on the prioritized job queue, the accelerator re-grouping execution plans associated with a target cluster topology to be achieved according to the placement of selected jobs from the prioritized job queue in relation to a location of respective ones of a plurality of accelerators within the computing cluster. One of the accelerator re-grouping execution plans is executed to allocate the selected jobs to the respective ones of the plurality of accelerators to thereby shift the computing cluster to the target cluster topology.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As aforementioned, when performing compute-intensive workloads such as data analytics and deep learning, an effective framework involves distributed parallel computing, which operates to disperse processing tasks across multiple processors (or preferably hardware accelerators) operating on one or more computing devices such that parallel processing may be executed simultaneously.

Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics. Data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. During a processing stage, learner units can independently generate data based on input data and/or previously learned data and such information can be gathered by a centralized entity or otherwise passed on to a global model for distribution to the other learners. However, a centralized approach for deep learning often suffers from communication delays, network bottlenecks and/or an imbalance in bandwidth and/or hardware utilization. Further, job scheduling in the cluster must be accurately performed to ensure that any one of the cluster nodes is underutilized or overutilized at a given time, which can inherently lead to poor job efficiency.

Accordingly, the present invention introduces novel techniques for increasing the efficiency of job scheduling by grouping jobs and/or accelerators (i.e., graphical processing units (GPUs) or field-programmable gate arrays (FPGAs), etc.) in the clustered environment. These techniques include providing a system to dynamically schedule deep learning jobs wherein the accelerators are rebalanced taking into account costs of transferring data between accelerators, generating new topologies of accelerators, and calculating the gain in computation power and cost of transferring data. The system leverages the training metrics and topology information placement on the GPU resources to calculate multiple costs associated with the scheduling, grouping, and distributing of data associated with each job in an attempt to identify a most efficient cluster topology, and subsequently adjust jobs and the grouping of accelerators to move the cluster to the identified most efficient topology. As will be discussed, following, these mechanisms improve accelerator utilization and simultaneously improve job performance while mitigating any impact on the scheduler workload of the cluster.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
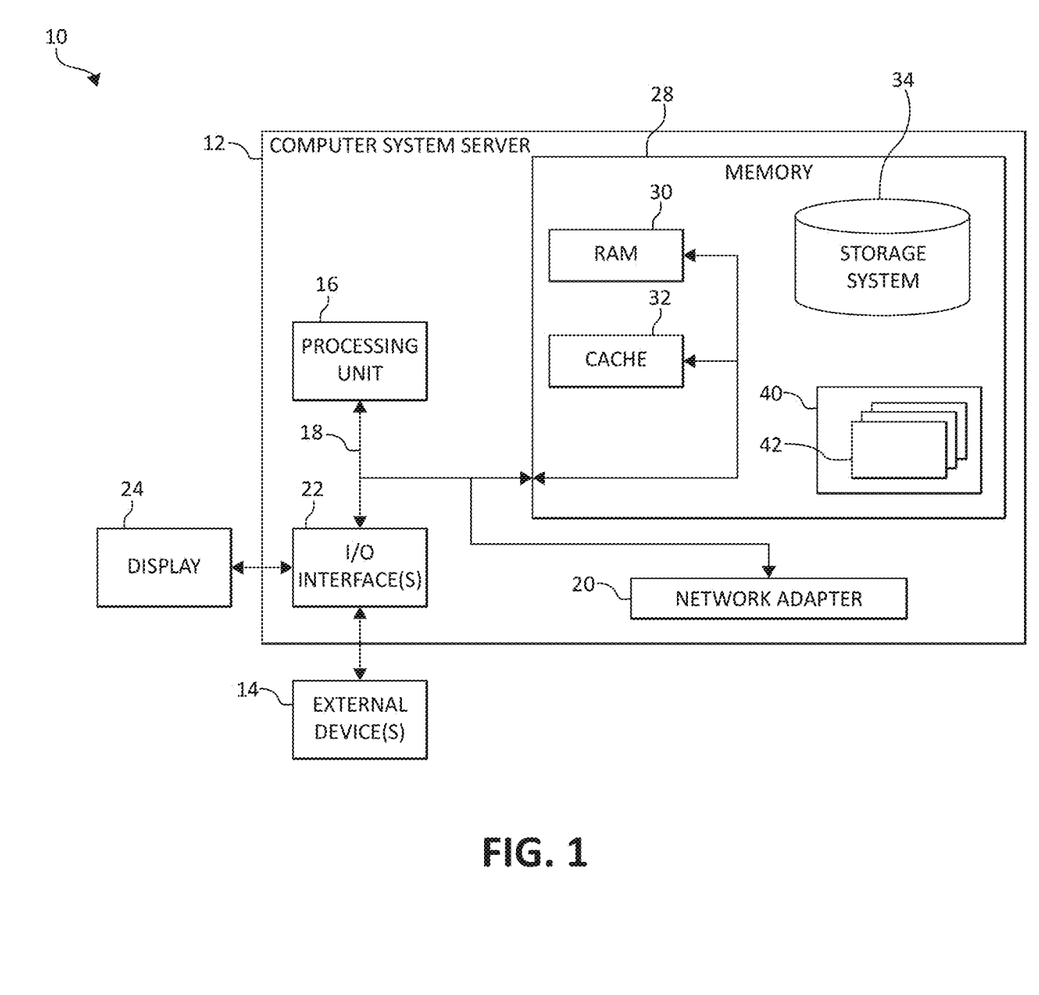
FIG. 1 is a block diagram depicting an exemplary computing node according, to embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
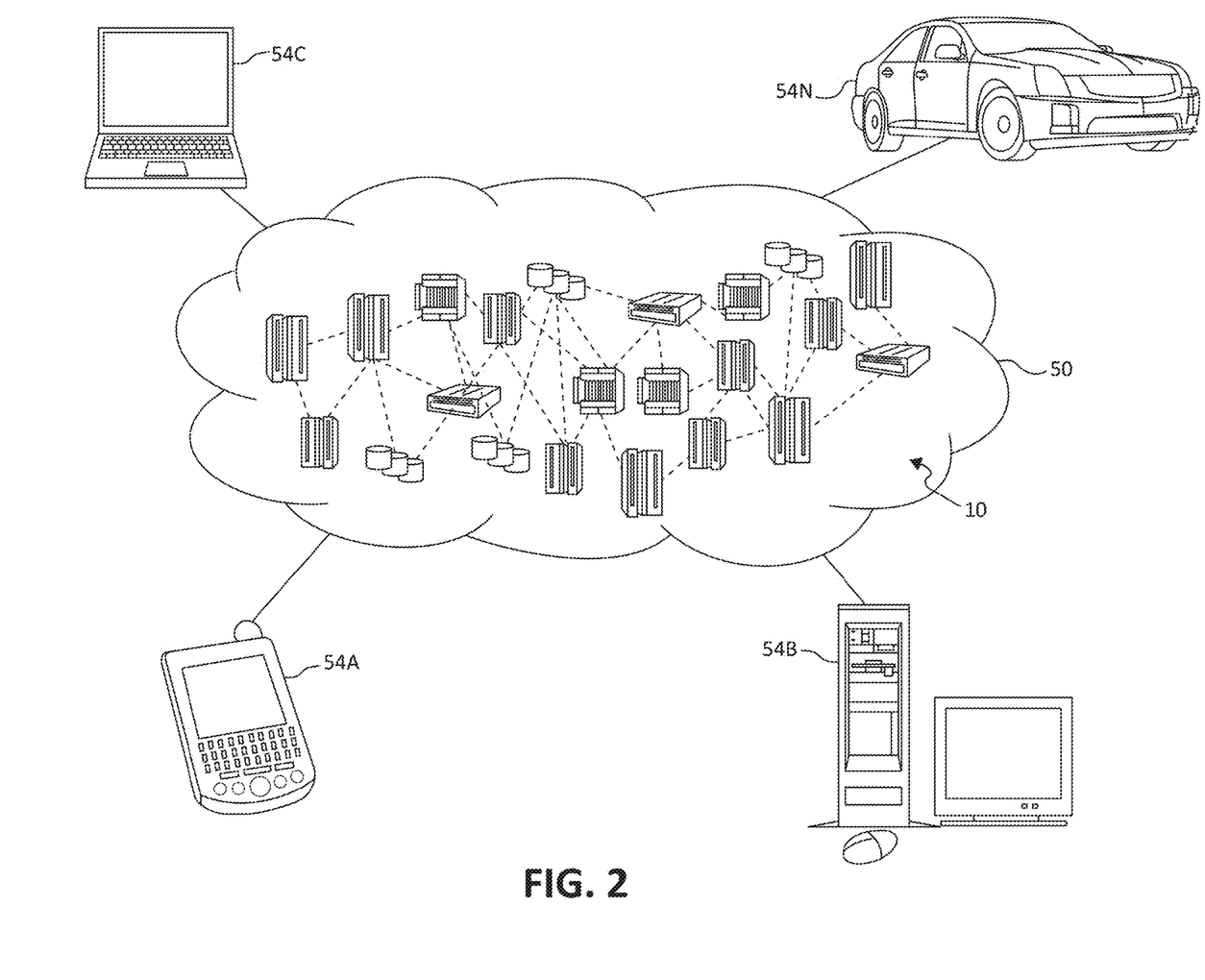
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
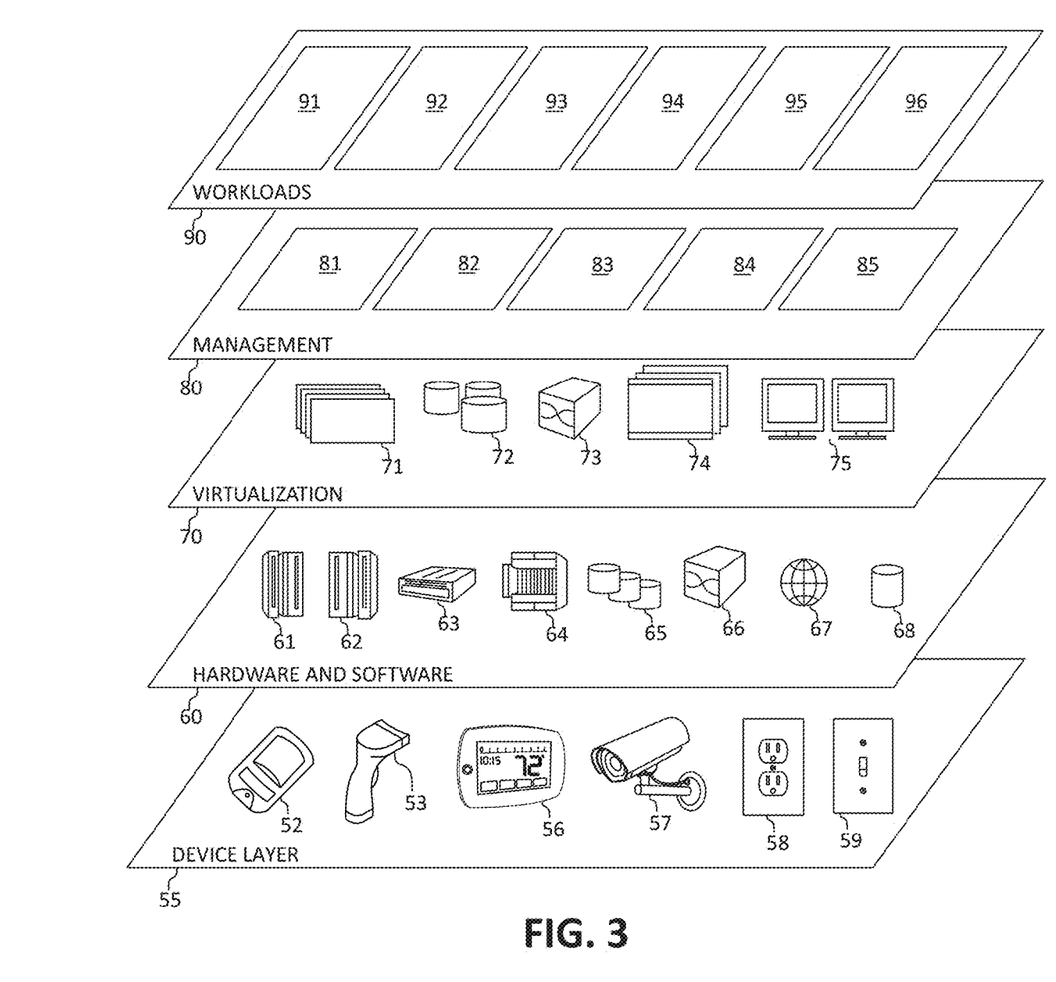
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning and large-scale data processing workloads and functions 96.

Dynamic Accelerator Scheduling and Grouping for Deep Learning

Embodiments described herein include techniques facilitating the scheduling and synchronization of processing components (e.g., accelerators) for parallel deep learning in distributed systems. As mentioned and as a general overview, data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. Processing components can utilize this training and can each receive a set of inputs to therefore collectively generate an output based on the set of inputs.

Generally, an output generated by a processing component can be provided to all other processing components in a designated group of processing components. In some implementations, the processing components in a particular group can change from time to time during the deep learning process and based on any number of different factors. Accordingly, collaborative groups of processing components can be dynamically synchronized for parallel learning. In an aspect, model weights for a deep learning system can be communicated amongst a subset of processing components (e.g., a set of parallel processing components). In some embodiments, communication between the one or more processing components can occur after the processing components in the subset complete a training process over a particular interval (e.g., over a defined mini-batch size, etc.).

Learning or "training" associated with the deep learning process can occur by selecting different subsets of processing components at different times during the deep learning process. Referencing FIG. 4A now, as illustrated in the distributed training architecture 400 for training learner nodes, local input partitions 402A-n are used on nodes 404A-n to compute a local model 406. This local model 406 is then used to update a global model 408, which is synchronized across all nodes 404A-n. Each node 404A-n repeats an iterative training algorithm wherein the respective node loads training data, calculates gradients based on the global model 408, aggregates and updates the global model 408 from the local model 406, and synchronizes a last computed model among all the nodes 404A-n. Of note, each node 404A-n performs an identical learning task, training, and synchronization to update the model for all nodes 404A-n. The cost (in terms of resources needed such as processing components, network components, etc.) for performing this synchronization is often significant and can affect performance.

Figure 4A:
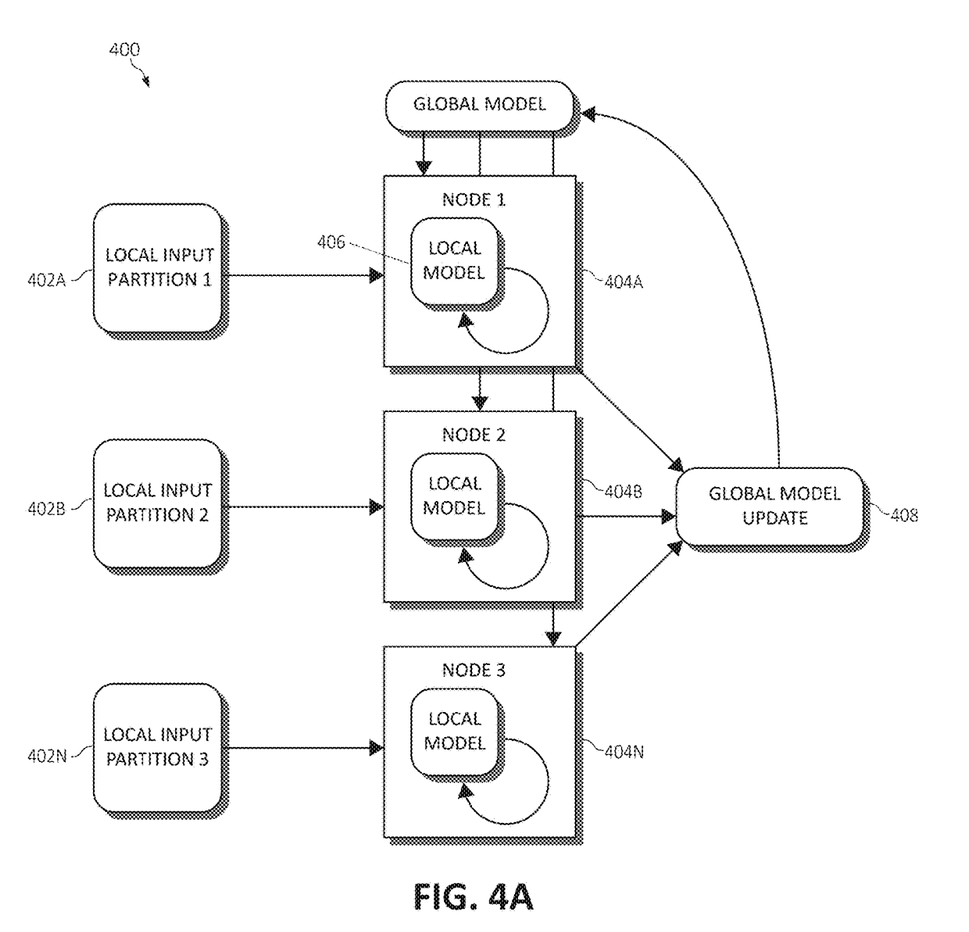
FIG. 4A is a block diagram depicting a distributed training architecture for training learner nodes, in accordance with aspects of the present invention.
Figure 4B:
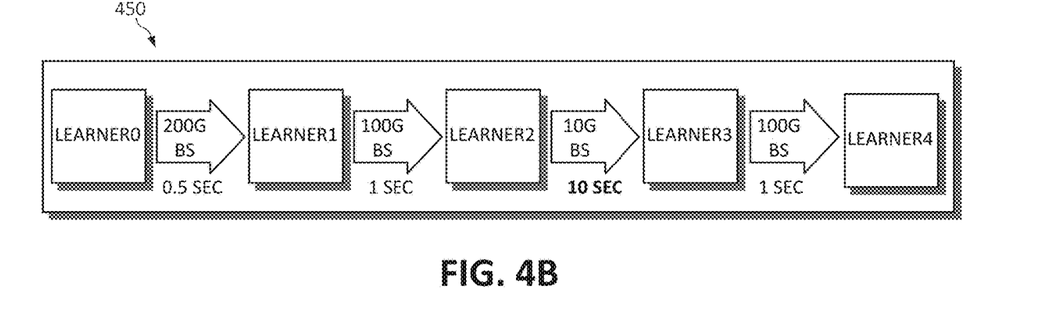
FIG. 4B is a block diagram depicting a network of learner nodes, in accordance with aspects of the present invention.

The underlying issue with the training system as described, is that the training system experiences efficiency effects caused by GPU resource utilization (both at a local level and a cluster level) and the aforementioned synchronization cost. The synchronization cost is factored heavily on the topology of the cluster. For example, in a VGG model having a 128.3 M model (batch) size per GPU, four GPUs equates to 1026 M data for synchronization. Now considering that generally GPU communication topology has a GPU-GPU throughput of 200 G/s, an NVLink throughput of 80 G/s, an Infiniband throughput of 100 G/s, and an Ethernet throughput of 10 G/s, it is recognizable that a bottleneck is found in the most-limited link between the nodes 404A-n. In other words, and referring to the network of learner nodes 450 in FIG. 4B, the Ethernet topology connecting learner2 and learner3 impacts the efficiency of the entire training model, as this link has a throughput substantially lower than those links between learner0 and learner1, for example. These types of mixed topologies are common in commercial deep learning frameworks (e.g., Minsky, DGX, etc.) and result in a massive waste of networking resources, as bandwidth on higher throughput protocols is limited by the most limited link.

Moreover, in a multiple application/tenant scenario, the GPU of a job may be scattered among several hosts which results in even lower efficiency. Therefore, the job scheduler must have awareness of both the workload of the jobs and the topology of the cluster to accurately schedule jobs to achieve a high resource utilization while providing a most efficient workload production environment as possible. Some prior art implementations exist which use a fixed number of GPUs and a fixed batch size, and attempt to schedule jobs based on a batch size configuration and resource policy, however, these implementations are heavily reliant on user expertise to adjust parameters of the system to achieve optimal results.

Accordingly, the mechanisms of the present invention, again, leverages training metrics and topology information to periodically group GPU resources for each job. The disclosed system has three main components, as depicted in the cluster scheduler 500 of FIG. 5, including: (a) A job selector 502 to calculate the "efficiency" of each running job in the cluster. Job selector 502 calculates an efficiency for each job and generates a prioritized job queue 506 for further processing. (b) A plan generator 508 to generate GPU re-grouping execution plans based on the prioritized job queue 506. The plan generator 508 includes a user defined threshold to limit the number of jobs to be planned and generates an action plan list 510 of execution actions for further decision (as to what actions to take on what particular resource/job to achieve its intended re-grouping execution plan). Each re-grouping execution plan uses an estimation based on a cost for training and synchronization in a new (target) cluster topology. As will be described, this estimation includes a method to calculate a "model sync cost" based on a synchronization policy and resource topology and a method to calculate a "training cost" based on minimum batch size (minbatch) per GPU. In this way, the target cluster topology in the action plan list 510 may be ultimately different when compared to the job queue 506. (c) A grouping engine 512 to direct each job to dynamically shift to determined resources to achieve the target cluster topology as demonstrated by the action plan list 510 of (at least one) of the GPU re-grouping execution plans.

Utilizing these mechanisms, cluster-wide dynamic GPU resource grouping is used to improve cluster efficiency for all jobs (as a single-job oriented optimization may not be best for the entire cluster); a smart efficiency calculation is provided which considers GPU distribution and job duration and does not impact the scheduler workload; and a user-defined threshold is established to balance the efficiency and impact of job/resource movement within the cluster.

Job Selector

Figure 5:
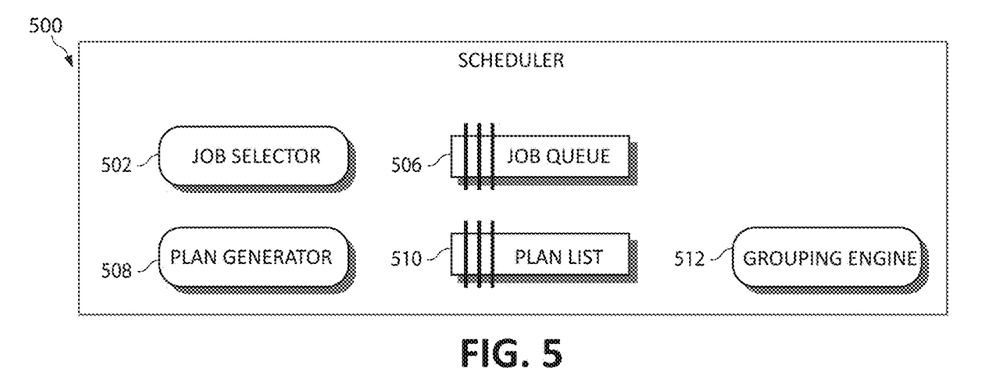
FIG. 5 is a block diagram depicting a cluster scheduler architecture, in accordance with aspects of the present invention.

In various embodiments, the job selector 502 is used to calculate an efficiency metric of each job running in the cluster and generate the prioritized job queue 506 using selected jobs having a certain efficiency metric. The jobs which are ultimately selected for the re-grouping execution plans comprise the least efficient jobs. Therefore, assuming that a smaller value equates to a more efficient job, the formula for calculating such may be expressed as:

$$(Host_{Total} - (GPUTotal/HostGPUMax)) * ModelSizeFactor * Time_{RemainingCalculation}$$

That is, the total number of hosts is deducted from a total number of GPUs divided by a total number of GPUs each host has. The output of this value is multiplied by a model size factor and a time of remaining calculation for the job.

Consider the following example, using the defined calculation and assuming the HostGPUMax is 4:
 a. JobA has 5 GPUs distributed among 4 hosts (1-1-1-2) and needs 2 hours for calculation:
  i. The efficiency of JobA is therefore: $E_{JobA} = (4-1)*2 = 6$
 b. JobB has 5 GPUs distributed among 2 hosts (2-3) and needs 2 hours for calculation:
  i. The efficiency of JobB is therefore: $E_{JobB} = (2-1)*2 = 2$ Using these efficiency metrics, the job order in the job queue 506 is therefore: $E_{JobA} - E_{JobB}$, or JobA (having a lower efficiency metric) proceeded by JobB (having a higher efficiency metric), and the scheduler 500 updates this efficiency metric of each job at a certain time interval.

Plan Generator

In various embodiments, the plan generator 508 sorts through the job queue 506 and selects certain jobs for planning, beginning with those jobs having a lowest efficiency metric (the least efficient jobs). The plan generator 508 then generates a list of re-grouping execution plans which instruct the scheduler 500 as to what predetermined action should be taken on which respective resource, and at what respective time. Each of the re-grouping execution plans is associated with a target cluster topology, meaning a topology to be achieved upon performing the predetermined actions to shift certain jobs to certain resources within the cluster. Each of the re-grouping execution plans further has associated an "efficiency gain", or in other words, a value amount of expected efficiency gained when considering the overall utilization and performance of the cluster after having implemented the respective re-grouping execution plan, which will be further described. Finally, each re-grouping execution plan has associated an action list of predetermined actions needed to be taken by the scheduler 500 to achieve the target cluster topology of the respective plan. For example, to switch Host1-GPU1 of JobA and Host2-GPU1 of JobB, the predetermined action list may be set as follows:
Time1 Stop Sending JobA Tasks to Host1-GPU1;
Time2 Stop Sending JobB Tasks to Host2-GPU1;
Time2 Start Sending JobA Tasks to Host2-GPU1; and
Time2 Start Sending JobB Tasks to Host1-GPU1.

The plan generator 508 sorts through numerous possibilities for shifting all selected jobs to a most efficient (target) cluster topology. The plan generator 508 then generates re-grouping execution plans for different target scenarios, each associated with differing predetermined actions. Upon generating a plurality of plans where each is associated with the differing predetermined actions, the re-grouping execution plan having the top efficiency gain is selected for execution. This selected plan is revisited regularly by checking the plan at the same time interval of updating of the efficiency metric in the job queue 506, and further the plan is updated if any changes occur in the job queue 506 upon checking the plan at the prescribed time interval.

Figure 6A:
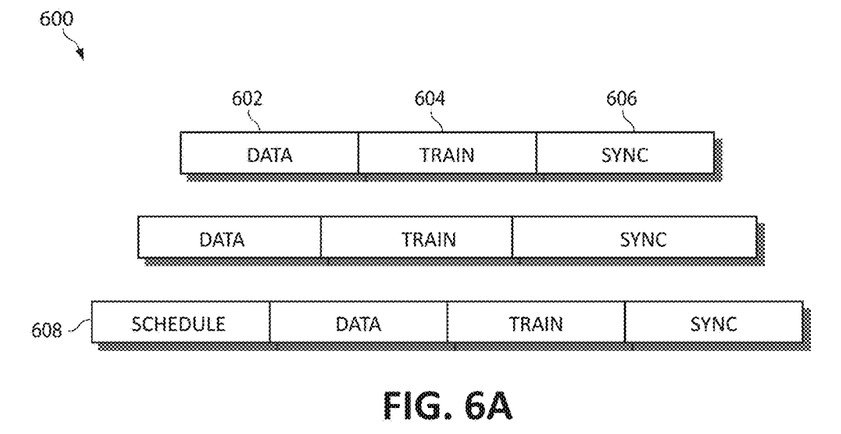
FIG. 6A is a block diagram depicting a job schedule timeline, in accordance with aspects of the present invention.
Figure 6B:
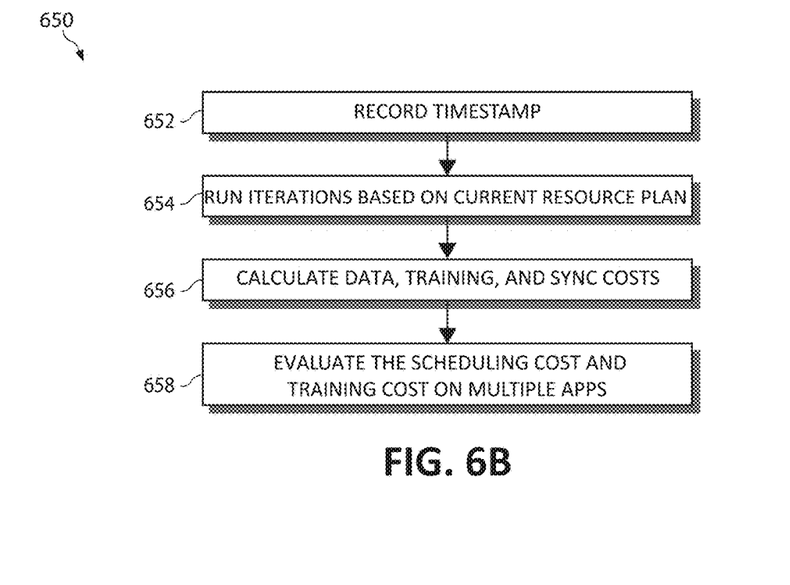
FIG. 6B is a flowchart diagram of an exemplary method for calculating training and synchronization costs, in accordance with aspects of the present invention.

To compute the different costs associated with the re-grouping execution plans, the following definitions are used. The training tasks associated with the nodes 404A-n include three phases: (a) a data loading time represented as T-data, (b) a training time represented as T-train, and (c) a model synchronization time represented as T-sync. Additionally, a job rescheduling cost is also considered, which is represented as T-schedule. FIG. 6A is a block diagram depicting a job schedule timeline 600 which represents these time periods with the T-data or data loading time represented as block 602, the T-train or training time represented as block 604, the T-sync or model synchronization time represented as block 606, and the T-schedule or job rescheduling cost represented as block 608. Similarly, the method 650 for calculating training and synchronization costs in FIG. 6B illustrates the process in which these calculations are used to evaluate the multiple costs considered in the re-grouping execution plans. Upon executing the training tasks on the multiple nodes 404A-n, a timestamp is first recorded at step 652. The nodes 404A-n run multiple iterations associated with the training tasks at step 654. At a certain interval, a training cost and a synchronization cost based on the T-data, T-train and T-sync times is calculated at step 656. Finally, the scheduling cost (T-schedule) and the training cost is evaluated on multiple applications at step 658.

Figure 7:
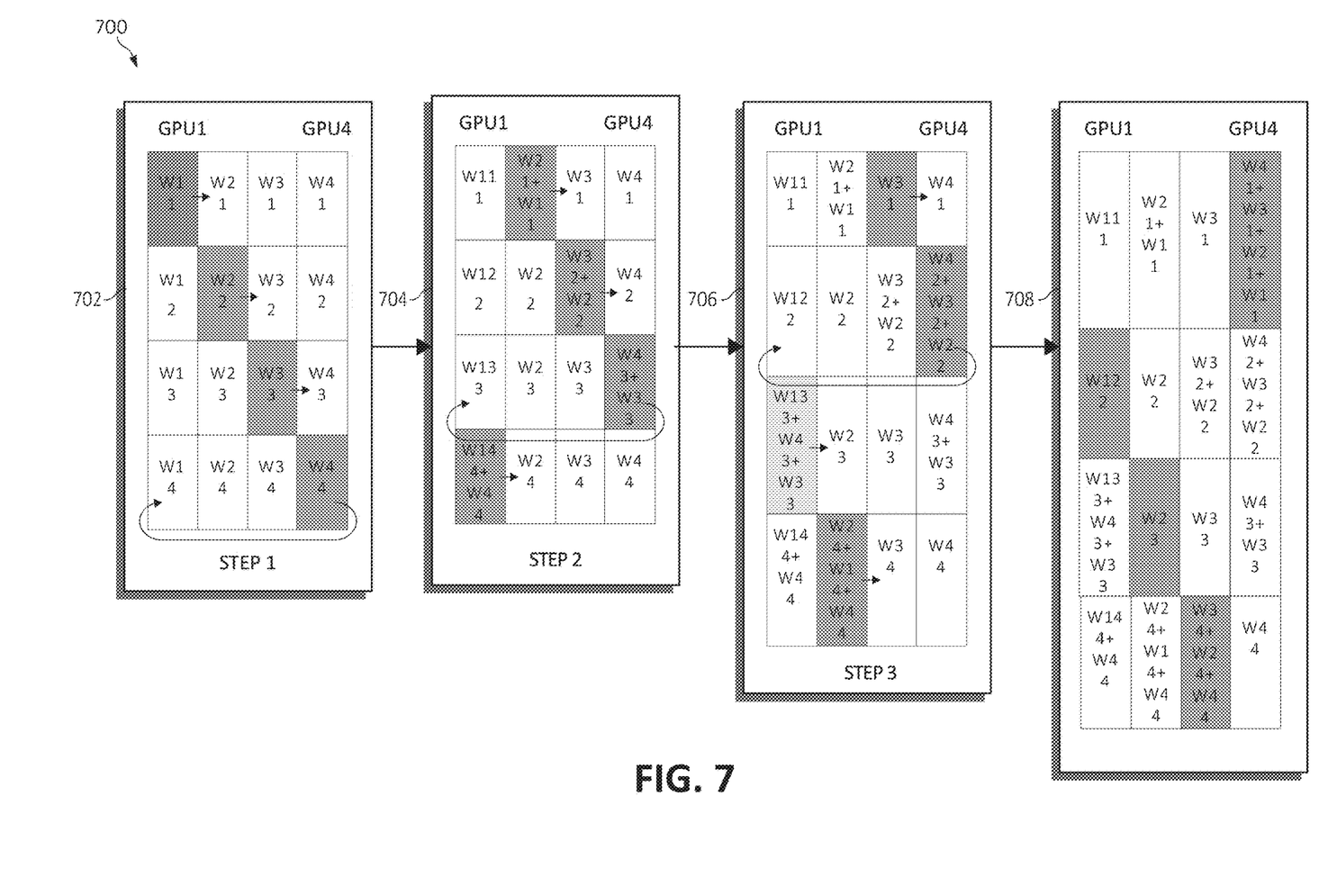
FIG. 7 is a block diagram depicting a distribution of a gradient array during the calculation of synchronization costs, in accordance with aspects of the present invention.

Continuing, FIG. 7 is a block diagram depicting a distribution of a gradient array 700 during the calculation of synchronization costs across the depicted GPUs 1-4. To calculate the synchronization cost, the gradient array 700 is divided at each GPU into four (N GPU parts), which may be represented as: [w1, ..., w4] [w2, ..., w4] [w3, ..., w4] [w4, ..., w4]. At each step, each i-th GPU sends ¼ of its gradient array to GPU (i)mod 4+1 (GPU 1→GPU2; GPU 2→GPU3; GPU 3→GPU4; and GPU 4→GPU1).

At step 1 (block 702), i-th GPU sends its i-th part of the gradient array. At step 2 (block 704), each i-th GPU sends its part (i−2)mod 4+1 of the gradient array (such that a 1st part is distributed to GPU 4; 2nd part is distributed to GPU 1; 3rd part is distributed to GPU 2; and 4th part is distributed to GPU 3). At step 3 (block 706), each i-th GPU sends its part (i−3)mod 4+1 of the gradient array (such that a 1st part is distributed to GPU 3; 2nd part distributed to GPU 4; 3rd part distributed to GPU 1; and 4th part is distributed to GPU 2). It is noted that after N−1 steps, all gradients are computed and distributed among N GPUs (as in the final gradient distribution in block 708), and a total time of gradient distribution is computed.

When considering the training tasks, and the associated cost evaluations, it should be noted that the T-train computation is sensitive as to the distribution model and application, the T-sync computation is sensitive according to the GPU topology, and the T-scheduling computation depends on the gap time of data within the GPU streaming pipeline. As an example, consider there are two types of training tasks executing on two GPUs, where:

Application-1 has costs represented as T-train-1, T-data-1, and T-sync-1; and
Application-2 has costs represented as T-train-2, T-data-2, and T-sync-2.

Application-1 and Application-2 are switched and a new cost (represented as T-sync-1a and T-sync-2a) is generated. Using these inputs, in a first scenario, if T-sync-1a>T-sync-1 and T-sync-2a>T-sync-2, no scheduling occurs. In a second scenario, if T-sync-1−T-sync-1a=<T-sync-2a−T-sync-2, the overall cost savings of redistribution is not enough to warrant any scheduling. If T-sync-1−T-sync-1a>=T-sync-2a−T-sync-2, the cost may have benefits to begin evaluation of the overall cost of re-scheduling. In a third scenario, if T-sync-1a=<T-sync-1 and T-sync-2a=<T-sync-2, the overall cost is further evaluated to determine whether re-scheduling should occur.

Figure 8A:
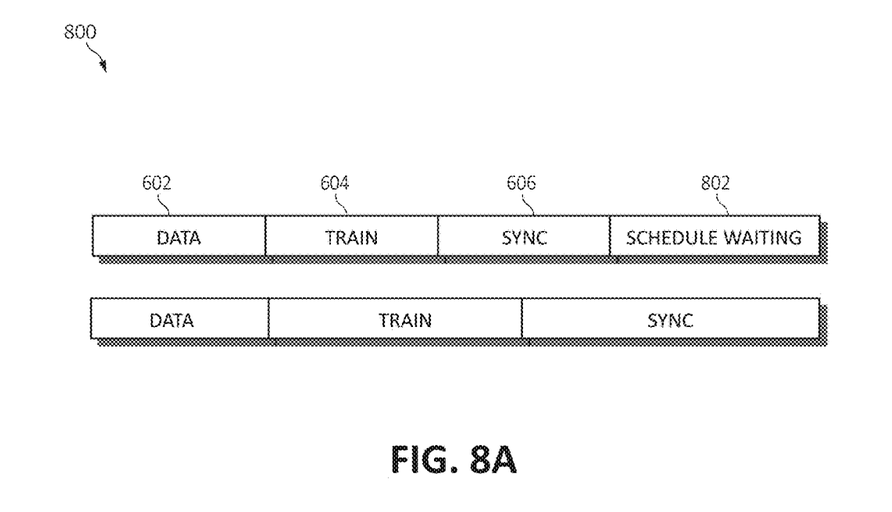
FIG. 8A is a block diagram depicting a job schedule timeline including an injected waiting period, in accordance with aspects of the present invention.

Since the scheduling of the training tasks must occur on the boundary of each training iteration, T-schedule is equated to a Cost-ss+Cost-waiting, where Cost-ss represents the resource adjust cost in session scheduler, and Cost-waiting represents the iteration boundary alignment. As depicted in the job schedule timeline 800 of FIG. 8A, the Cost-waiting, which is a scheduled waiting period 802, represents the cost of waiting until the next training iteration to adjust the training task scheduling in the scheduler 500. The goal is to achieve as minimal a scheduling-to-waiting time period as possible (Min(T-scheduling+T-sync-1a+T-sync-2a)).

Figure 8B:
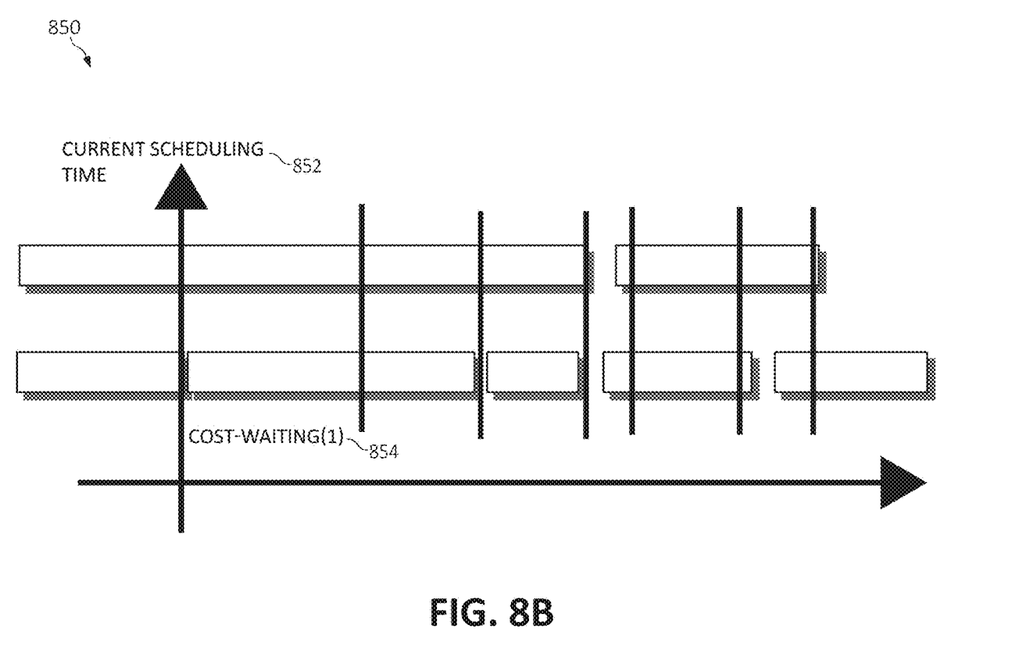
FIG. 8B is a block diagram depicting a current scheduling and waiting cost timeline, in accordance with aspects of the present invention.

FIG. 8B is a block diagram depicting a current scheduling and waiting cost timeline 850 commensurate with this training task scheduling cost. As aforementioned, T-scheduling=Cost-ss+Cost-waiting. Therefore, when compared to a current scheduling time 852, the Cost-waiting(1) 854 equals the difference between a predicted T-training time between iterations added to a difference between the T-sync-1 and T-sync-2 times (represented as: ||T-training-predicted-1−T-training-predicted-2||+||T-sync-1−T-sync-2||). The Cost-waiting is shifted along with the training iteration calculation by certain steps, as shown in timeline 850. Therefore, the Cost-waiting (Steps)=Cost-waiting(1) 854+ T-1*Steps−T-2*Steps.

Subsequently and taking these formulae, the overall job cost evaluation in one of the re-grouping execution plans is computed as: JobCost-Overall (StepsN)=Sum(Cost-job(j, stepN). In the example of the aforementioned two jobs above, this cost is therefore calculated as:

$$\text{Cost-1}(N) = \text{Cost-Waiting}(N) + \text{Steps}^* T\text{-sync-1} + (\text{IterationTotal} - N)^* T\text{-sync-1}a; \text{ and}$$

$$\text{Cost-2}(N) = \text{Cost-Waiting}(N) + \text{Steps}^* T\text{-sync-2} + (\text{IterationTotal} - N)^* T\text{-sync-2}a.$$

Using this computation, the overall cost for the next N steps is simulated to identify the best match for a most efficient scheduling cycle.

Figure 9:
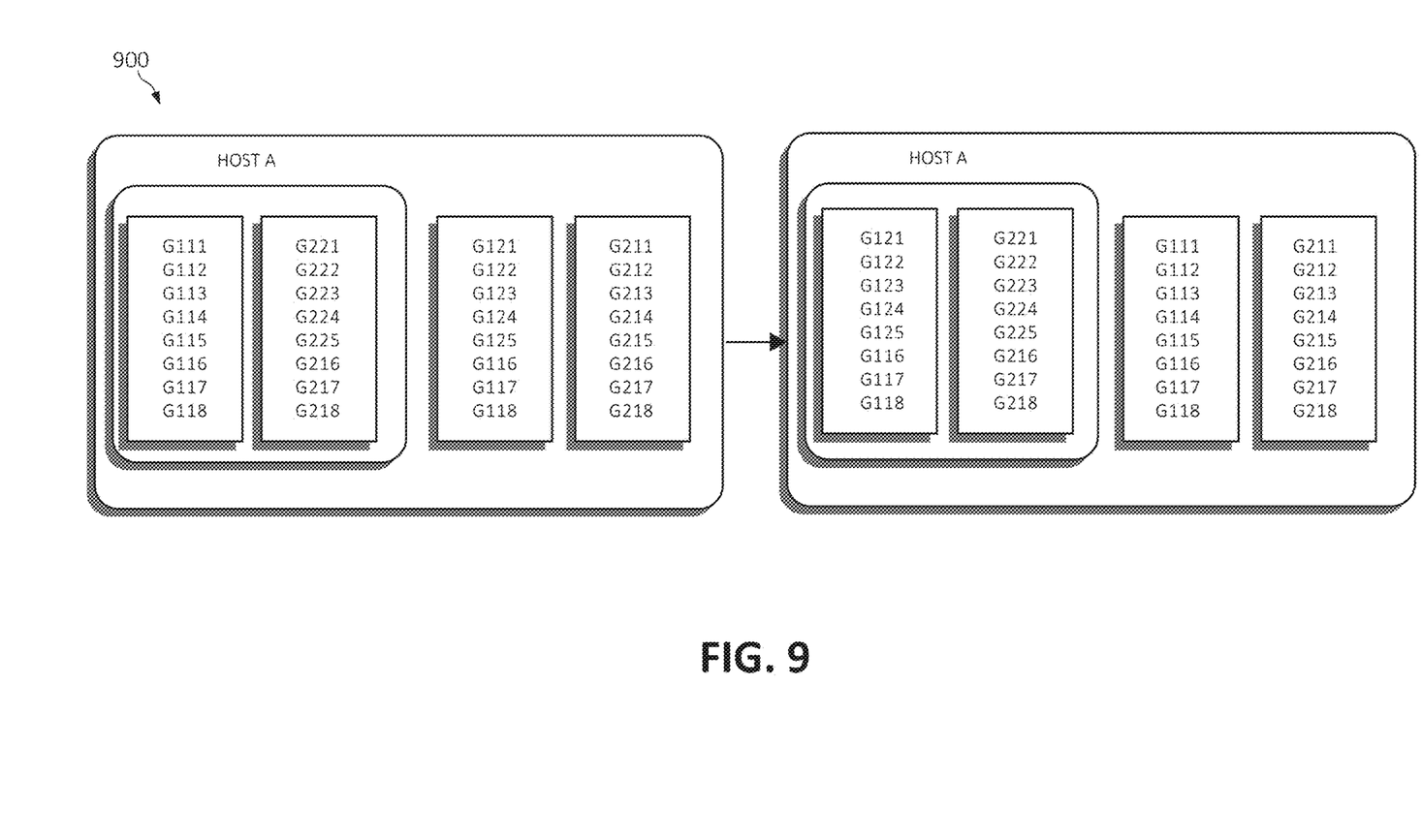
FIG. 9 is a block diagram depicting an accelerator adjustment plan among hosts, in accordance with aspects of the present invention.

Next, when considering the predetermined actions associated with each re-grouping execution plan, an associated GPU adjustment plan 900 is depicted in FIG. 9. According to the adjustment plan 900, the potential list of GPUs involved with the adjustment plan (the GPUs affected by the predetermined actions) is filtered. When a GPU already exists in the same host, only one adjustment plan is generated, however the host dedicated for performing the job (the host executing the job) is not involved in the plan generation. The rest of the GPUs of the cluster perform the generation of the adjustment plan based on peer swapping.

Grouping Engine

The grouping engine 512 influences jobs based on a chosen re-grouping execution plan and instructs the scheduler 500 as to what actions to take associated with the re-grouping execution plan. The scheduler 500, however, may only influence jobs after a task has been completed. Therefore, a top action in the list of predetermined actions associated with the particular re-grouping execution plan is taken when the given task has been completed and a timer is set to complete the next action in the list of predetermined actions upon the timer expiring. Upon the particular re-grouping execution plan being refreshed (for example by an update to the job queue 506), the timer is reset.

Figure 10:
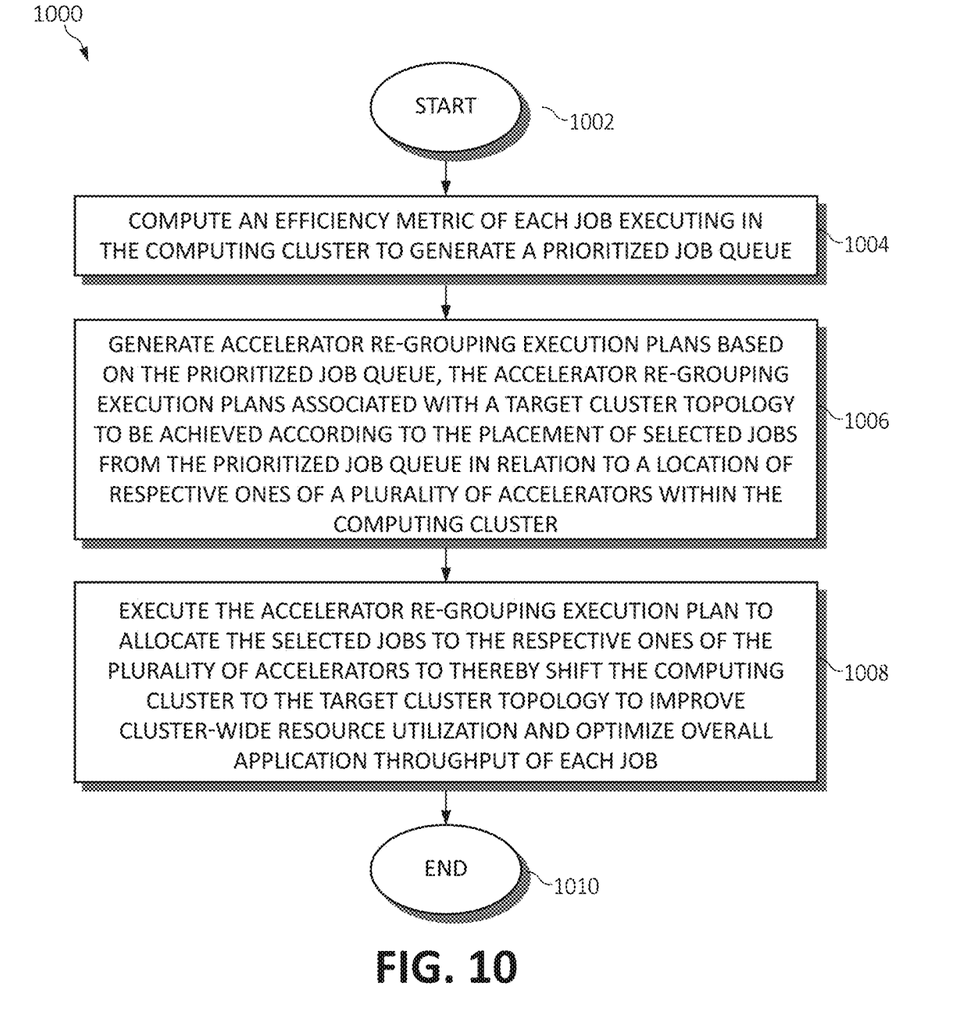
FIG. 10 is a flowchart diagram of an exemplary method for dynamic accelerator scheduling and grouping for deep learning jobs in a computing cluster, in accordance with aspects of the present invention.

Forming a summary, FIG. 10 is a flowchart diagram of an exemplary method 1000 for dynamic accelerator scheduling and grouping for deep learning jobs in a computing cluster. Each of the steps of the method 1000 may be performed by any suitable component of the operating environment. For example, in various embodiments, the method 1000 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning at step 1002, an efficiency metric of each job executing in the computing cluster is calculated to generate a prioritized job queue (step 1004). Accelerator re-grouping execution plans are then generated based on the prioritized job queue, the accelerator re-grouping execution plans associated with a target cluster topology to be achieved according to the placement of selected jobs from the prioritized job queue in relation to a location of respective ones of a plurality of accelerators within the computing cluster (step 1006). One of the accelerator re-grouping execution plans is executed to allocate the selected jobs to the respective ones of the plurality of accelerators to thereby shift the computing cluster to the target cluster topology to improve cluster-wide resource utilization and optimize overall application throughput of each executing job (step 1008). The method 1000 ends (step 1010).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for dynamic accelerator scheduling and grouping for deep learning jobs in a computing cluster, by a processor, comprising:
    computing an efficiency metric of each job executing in the computing cluster to generate a prioritized job queue, wherein the efficiency metric is computed based on a number of the plurality of accelerators executing a respective job, a host distribution of the number of the plurality of accelerators, and a remaining calculation time of the respective job, wherein the prioritized job queue is sorted in order of a smallest efficiency metric to a largest efficiency metric; and wherein the efficiency metric is updated by a scheduler at predetermined time intervals;
    generating accelerator re-grouping execution plans based on the prioritized job queue, the accelerator re-grouping execution plans associated with a target cluster topology to be achieved according to the placement of selected jobs from the prioritized job queue in relation to a location of respective ones of a plurality of accelerators within the computing cluster;
    computing a scheduling cost for each job based on the target cluster topology to generate an optimal scheduling cycle of each job to the respective ones of the plurality of accelerators; wherein the scheduling cost accounts for a resource adjustment cost in the scheduler and a waiting cost associated with an iteration boundary alignment; and
    executing one of the accelerator re-grouping execution plans to allocate the selected jobs to the respective ones of the plurality of accelerators to thereby shift the computing cluster to the target cluster topology.

2. The method of claim 1, further including selecting, for the accelerator re-grouping execution plans, the selected jobs having a largest efficiency metric from the prioritized job queue; wherein a user defined threshold is used to limit a total number of jobs to be planned in the accelerator re-grouping execution plans.

3. The method of claim 2, wherein generating each of the accelerator re-grouping execution plans further includes generating an action list of predetermined actions for each of the selected jobs to achieve the target cluster topology, the predetermined actions including identifying which of the respective ones of the plurality of accelerators, and at what certain time, to commence and cease execution of a given one of the selected jobs upon.

4. The method of claim 1, further including sorting through the accelerator re-grouping execution plans to identify one of the accelerator re-grouping execution plans having a highest expected efficiency gain, the efficiency gain computed through a cost evaluation; wherein the cost evaluation includes computing at least one of a training cost, a model synchronization cost, and a data transfer cost.

5. The method of claim 4, further including executing the one of the accelerator re-grouping execution plans having the highest expected efficiency gain by performing, in a predetermined order, the predetermined actions associated with the one of the accelerator re-grouping execution plans; wherein a first one of the predetermined actions is performed commensurate with a timer being started to perform a second one of the predetermined actions upon the timer expiring.

6. A system for dynamic accelerator scheduling and grouping for deep learning jobs in a computing cluster, the system comprising:
    a plurality of accelerators;
    a memory device; and
    a processor executing instructions stored in the memory device, wherein the processor:
        computes an efficiency metric of each job executing in the computing cluster to generate a prioritized job queue, wherein the efficiency metric is computed based on a number of the plurality of accelerators executing a respective job, a host distribution of the number of the plurality of accelerators, and a remaining calculation time of the respective job, wherein the prioritized job queue is sorted in order of a smallest efficiency metric to a largest efficiency metric; and wherein the efficiency metric is updated by a scheduler at predetermined time intervals;
        generates accelerator re-grouping execution plans based on the prioritized job queue, the accelerator re-grouping execution plans associated with a target cluster topology to be achieved according to the placement of selected jobs from the prioritized job queue in relation to a location of respective ones of a plurality of accelerators within the computing cluster;
        computes a scheduling cost for each job based on the target cluster topology to generate an optimal scheduling cycle of each job to the respective ones of the plurality of accelerators; wherein the scheduling cost accounts for a resource adjustment cost in the scheduler and a waiting cost associated with an iteration boundary alignment; and
        executes one of the accelerator re-grouping execution plans to allocate the selected jobs to the respective ones of the plurality of accelerators to thereby shift the computing cluster to the target cluster topology.

7. The system of claim 6, wherein the processor selects, for the accelerator re-grouping execution plans, the selected jobs having a largest efficiency metric from the prioritized job queue; wherein a user defined threshold is used to limit a total number of jobs to be planned in the accelerator re-grouping execution plans.

8. The system of claim 7, wherein generating each of the accelerator re-grouping execution plans further includes generating an action list of predetermined actions for each of the selected jobs to achieve the target cluster topology, the predetermined actions including identifying which of the respective ones of the plurality of accelerators, and at what certain time, to commence and cease execution of a given one of the selected jobs upon.

9. The system of claim 6, wherein the processor sorts through the accelerator re-grouping execution plans to identify one of the accelerator re-grouping execution plans having a highest expected efficiency gain, the efficiency gain computed through a cost evaluation; wherein the cost evaluation includes computing at least one of a training cost, a model synchronization cost, and a data transfer cost.

10. The system of claim 9, wherein the processor executes the one of the accelerator re-grouping execution plans having the highest expected efficiency gain by performing, in a predetermined order, the predetermined actions associated with the one of the accelerator re-grouping execution plans; wherein a first one of the predetermined actions is performed commensurate with a timer being started to perform a second one of the predetermined actions upon the timer expiring.

11. A computer program product for dynamic accelerator scheduling and grouping for deep learning jobs in a computing cluster, by a processor, the computer program product embodied on a non-transitory computer-readable storage medium having computer-readable program code portions stored therein, the computer-readable program code portions comprising:
  an executable portion that computes an efficiency metric of each job executing in the computing cluster to generate a prioritized job queue, wherein the efficiency metric is computed based on a number of the plurality of accelerators executing a respective job, a host distribution of the number of the plurality of accelerators, and a remaining calculation time of the respective job, wherein the prioritized job queue is sorted in order of a smallest efficiency metric to a largest efficiency metric; and wherein the efficiency metric is updated by a scheduler at predetermined time intervals;
  an executable portion that generates accelerator re-grouping execution plans based on the prioritized job queue, the accelerator re-grouping execution plans associated with a target cluster topology to be achieved according to the placement of selected jobs from the prioritized job queue in relation to a location of respective ones of a plurality of accelerators within the computing cluster;
  an executable portion that computes a scheduling cost for each job based on the target cluster topology to generate an optimal scheduling cycle of each job to the respective ones of the plurality of accelerators; wherein the scheduling cost accounts for a resource adjustment cost in the scheduler and a waiting cost associated with an iteration boundary alignment; and
  an executable portion that executes one of the accelerator re-grouping execution plans to allocate the selected jobs to the respective ones of the plurality of accelerators to thereby shift the computing cluster to the target cluster topology.

12. The computer program product of claim 11, further including an executable portion that selects, for the accelerator re-grouping execution plans, the selected jobs having a largest efficiency metric from the prioritized job queue; wherein a user defined threshold is used to limit a total number of jobs to be planned in the accelerator re-grouping execution plans.

13. The computer program product of claim 12, wherein generating each of the accelerator re-grouping execution plans further includes generating an action list of predetermined actions for each of the selected jobs to achieve the target cluster topology, the predetermined actions including identifying which of the respective ones of the plurality of accelerators, and at what certain time, to commence and cease execution of a given one of the selected jobs upon.

14. The computer program product of claim 11, further including an executable portion that sorts through the accelerator re-grouping execution plans to identify one of the accelerator re-grouping execution plans having a highest expected efficiency gain, the efficiency gain computed through a cost evaluation; wherein the cost evaluation includes computing at least one of a training cost, a model synchronization cost, and a data transfer cost.

15. The computer program product of claim 14, further including an executable portion that executes the one of the accelerator re-grouping execution plans having the highest expected efficiency gain by performing, in a predetermined order, the predetermined actions associated with the one of the accelerator re-grouping execution plans; wherein a first one of the predetermined actions is performed commensurate with a timer being started to perform a second one of the predetermined actions upon the timer expiring.

* * * * *